United States Patent
Kern et al.

(10) Patent No.: US 7,791,235 B2
(45) Date of Patent: Sep. 7, 2010

(54) VARIABLE MAGNETIC COUPLING OF ROTATING MACHINERY

(75) Inventors: John M. Kern, Rexford, NY (US); Juan M. De Bedout, Glenville, NY (US); Kiyoung Chung, West Chester, OH (US); Michal-Wolfgang Waszak, Nandlstadt (DE); Manoj Ramprasad Shah, Latham, NY (US); Peter D. Toot, Cincinnati, OH (US); Ronghai Qu, Clifton Park, NY (US); Wei Wu, Canton, MI (US)

(73) Assignee: General Electric Company, Schenectady, NY (US)

( * ) Notice: Subject to any disclaimer, the term of this patent is extended or adjusted under 35 U.S.C. 154(b) by 928 days.

(21) Appl. No.: 11/615,627

(22) Filed: Dec. 22, 2006

(65) Prior Publication Data

US 2008/0149445 A1 Jun. 26, 2008

(51) Int. Cl.
*H02K 7/10* (2006.01)
(52) U.S. Cl. ..................................................... 310/103
(58) Field of Classification Search ......... 310/103–105, 310/39.163
See application file for complete search history.

(56) References Cited

U.S. PATENT DOCUMENTS

| | | | | |
|---|---|---|---|---|
| 1,697,292 A | * | 1/1929 | Sperry | 310/96 |
| 2,311,331 A | * | 2/1943 | Ericson | 73/862.191 |
| 2,523,046 A | | 9/1950 | Montgomery | |
| 2,689,920 A | | 9/1954 | Jaeschke | |
| 3,455,419 A | | 7/1969 | Miquel | |
| 3,936,683 A | * | 2/1976 | Walker | 310/103 |
| 4,808,869 A | * | 2/1989 | Kopp | 310/78 |
| 5,508,574 A | | 4/1996 | Vlock | |
| 5,523,638 A | | 6/1996 | Albrecht et al. | |
| 5,834,872 A | | 11/1998 | Lamb | |
| 5,994,809 A | * | 11/1999 | Ackermann | 310/103 |
| 6,121,705 A | * | 9/2000 | Hoong | 310/113 |
| 6,217,298 B1 | * | 4/2001 | Klaui | 417/420 |
| 6,230,866 B1 | | 5/2001 | Link | |
| 6,252,331 B1 | | 6/2001 | Mildice et al. | |
| RE37,743 E | | 6/2002 | Yang | |

(Continued)

FOREIGN PATENT DOCUMENTS

DE 19604710 8/1997

(Continued)

*Primary Examiner*—Dang D Le
(74) *Attorney, Agent, or Firm*—McNees Wallace & Nurick, LLC

(57) ABSTRACT

A system for transferring torque between a pair of independently, concurrently rotating shafts of a turbofan engine includes a magnetic gearbox. The magnetic gearbox has a first ring structure, a second ring structure and an intermediate ring structure. Each ring structure has an annular aperture therethrough and a plurality of permanent magnets embedded therein. The intermediate ring structure is disposed between the first and the second ring structures. Each ring structure is coaxially concentric with, and independently rotatable with respect to the remaining ring structures. The first and second ring structures are each coupled to separate ones of the rotating engine shafts, and the intermediate ring is operable to transfer torque between the pair of shafts. Preferably, the intermediate ring structure is coupled to a rotating machine. The rotating machine has a controller, and is operable for adjusting a ratio of torque transferred between the pair of shafts.

23 Claims, 9 Drawing Sheets

U.S. PATENT DOCUMENTS 6,794,781 B2    9/2004   Razzell et al.
6,895,741 B2 *  5/2005   Rago et al. .................. 60/226.1

FOREIGN PATENT DOCUMENTS

| | | |
|---|---|---|
| DE | 19717340 | 10/1998 |
| DE | 19905862 | 8/2000 |
| DE | 10215488 | 10/2003 |
| FR | 2540951 | 8/1984 |
| JP | 08196071 A | 7/1996 |
| WO | 9823025 | 5/1998 |

* cited by examiner

VARIABLE MAGNETIC COUPLING OF ROTATING MACHINERY

FIELD OF THE INVENTION

The present invention is directed to a method and apparatus for coupling of rotating machines, and more specifically to coupling of high pressure (HP) and low pressure (LP) turbine shafts of a turbofan machine

BACKGROUND OF THE INVENTION

A gas turbine engine generally includes one or more compressors followed in turn by a combustor and high and low pressure turbines. These engine components are arranged in serial flow communication and disposed about a longitudinal axis centerline of the engine within an annular outer casing. The compressors are driven by the respective turbines and compressor air during operation. The compressor air is mixed with fuel and ignited in the combustor for generating hot combustion gases. The combustion gases flow through the high and low pressure turbines, which extract the energy generated by the hot combustion gases for driving the compressors, and for producing auxiliary output power.

The engine power is transferred either as shaft power or thrust for powering an aircraft in flight. For example, in other rotatable loads, such as a fan rotor in a by-pass turbofan engine, or propellers in a gas turbine propeller engine, power is extracted from the high and low pressure turbines for driving the respective fan rotor and the propellers.

It is well understood that individual components of turbofan engines, in operation, require different power parameters. For example, the fan rotational speed is limited to a degree by the tip velocity and, since the fan diameter is very large, rotational speed must be very low. The core compressor, on the other hand, because of its much smaller tip diameter, can be driven at a higher rotational speed. Therefore, separate high and low turbines with independent power transmitting devices are necessary for the fan and core compressor in aircraft gas turbine engines. Furthermore since a turbine is most efficient at higher rotational speeds, the lower speed turbine driving the fan requires additional stages to extract the necessary power.

Many new aircraft systems are designed to accommodate electrical loads that are greater than those on current aircraft systems. The electrical system specifications of commercial airliner designs currently being developed may demand up to twice the electrical power of current commercial airliners. This increased electrical power demand must be derived from mechanical power extracted from the engines that power the aircraft. When operating an aircraft engine at relatively low power levels, e.g., while idly descending from altitude, extracting this additional electrical power from the engine mechanical power may reduce the ability to operate the engine properly.

Traditionally, electrical power is extracted from the high-pressure (HP) engine spool in a gas turbine engine. The relatively high operating speed of the HP engine spool makes it an ideal source of mechanical power to drive the electrical generators connected to the engine. However, it is desirable to draw power from additional sources within the engine, rather than rely solely on the HP engine spool to drive the electrical generators. The LP engine spool provides an alternate source of power transfer, however, the relatively lower speed of the LP engine spool typically requires the use of a gearbox, as slow-speed electrical generators are often larger than similarly rated electrical generators operating at higher speeds.

However, extracting this additional mechanical power from an engine when it is operating at relatively low power levels (e.g., at or near idle descending from altitude, low power for taxi, etc.) may lead to reduced engine operability. Traditionally, this power is extracted from the high-pressure (HP) engine spool. Its relatively high operating speed makes it an ideal source for mechanical power to drive electrical generators that are attached to the engine. However, it is desirable at times to increase the amount of power that is available on this spool, by transferring torque and power to it via some other means.

Another source of power within the engine is the low-pressure (LP) spool, which typically operates at speeds much slower than the HP spool, and over a relatively wider speed range. Tapping this low-speed mechanical power source without transformation result in impractically large generators.

Many solutions to this transformation have been proposed, including various types of conventional transmissions, mechanical gearing, and electromechanical configurations. One such solution is a turbine engine that utilizes a third, intermediate-pressure (IP) spool to drive a generator independently. However, this third spool is also required at times to couple to the HP spool. The means used to couple the IP and HP spools are mechanical clutch or viscous-type coupling mechanisms.

U.S. Pat. No. 6,895,741, issued May 24, 2005, and entitled "Differential Geared Turbine Engine with Torque Modulation Capacity", discloses a mechanically geared engine having three shafts. The fan, compressor, and turbine shafts are mechanically coupled by applying additional epicyclic gear arrangements. Electromagnetic machines can be controlled for selectively modulating the torque versus speed characteristic of the compressor and the fan, and for modulating the rotational speed relationship between the turbine, compressor and the fan. The machines can be used as electric starters. Either or both of the compressor rotor shaft and the fan rotor shaft can be rotated by machines which receive electrical power and operate as motors to electrically start the engine. However, this does not provide a solution to coupling of concurrently rotating HP and LP turboshafts without using a mechanical gearbox.

Therefore, there is a need for a system of controllably transferring power between independently rotating machines operating at different speeds, without a mechanical gearbox, and for transferring torque between independently rotating machines using magnetic coupling techniques.

SUMMARY OF THE INVENTION

A new method is described for variably transferring mechanical torque from one rotating machine to another, relying solely upon magnetic effects in a planetary magnetic gearbox, to couple one machine to another. A second means is used to variably control the torque transfer. The present invention is applicable to turbofan engines to couple rotating shafts at differing speeds within the turbofan engine for controllably transferring power. By applying the relatively high- and low-speed engine shafts to an epicyclic magnetic gearbox, an effective gear ratio can be modulated by variably operating on a third input of the epicyclic gearbox. At ranges of normal operating speeds, the torque modulation provides controllable power transfer between shafts. The present invention can be particularly useful for extracting greater amounts of mechanical power from an engine, or in enhancing dynamic engine performance. Optionally, additional gearing may be employed to achieve a desired range of operability.

In one aspect, the present invention is directed to a system for transferring torque between a pair of independently, concurrently rotating shafts of an engine. The system includes a magnetic gearbox. The magnetic gearbox has a first ring structure, a second ring structure and an intermediate ring structure. The first, second and intermediate ring structures each include an annular aperture therethrough and have a plurality of magnetic pole pieces embedded therein. The intermediate ring structure is disposed between the first ring structure and the second ring structure. The first, second and intermediate ring structures are coaxially disposed, are concentric with, and are independently rotatable, with respect to the remaining ring structures. The first and second ring structures are coupled to separate ones of the rotating engine shafts. The intermediate ring structure cooperates with the first ring structure and second ring structure and determines the level of torque transferred torque between the pair of shafts.

The intermediate ring structure may be coupled to a rotating machine. The rotating machine has a controller and is operable for adjusting a ratio of angular speed and hence the ratio of power transferred between the pair of shafts. In one embodiment, the rotating machine is a motor/generator configured to receive power from and to supply power to the intermediate ring structure in response to a signal generated by the controller, such that the power is distributed variably between the pair of rotating shafts.

In another aspect, the present invention is directed to a gas turbine engine. The gas turbine engine includes a low pressure turbine spool and a high pressure turbine spool, at least one compression stage, a combustion chamber, an exhaust system and a rotary fan blade arrangement. The low pressure turbine spool and the high pressure turbine spool are magnetically coupled through a magnetic gearbox. The magnetic gearbox has a first ring structure, a second ring structure and an intermediate ring structure. The first, second and intermediate ring structures each include an annular aperture therethrough and have a plurality of magnetic pole pieces embedded therein. The intermediate ring structure is disposed between the first ring structure and the second ring structure. The first, second and intermediate ring structures are coaxially disposed, are concentric with, and are independently rotatable, with respect to the remaining ring structures. The first and second ring structures are coupled to separate ones of the rotating engine shafts. The intermediate ring is operable to transfer torque between the high pressure turbine spool and the low pressure turbine spool. The intermediate ring structure may be coupled to a rotating machine. The rotating machine has a controller and is operable for adjusting a ratio of power transferred between the high pressure turbine spool and the low pressure turbine spool. The rotating machine may be a motor/generator configured to receive power from and to supply power to the intermediate ring structure in response to a signal generated by the controller, such that the torque is distributed variably between the pair of rotating shafts.

The present invention is also directed to a method of transferring torque between first and second independently rotating shafts of a gas turbine engine. The method includes the steps of providing an adjustable magnetic gearbox having a first ring structure, a second ring structure and an intermediate ring structure, each of the first, second and intermediate ring structure having an annular aperture therethrough and a plurality of magnetic pole pieces embedded therein, the intermediate ring structure disposed between the first ring structure and the second ring structure, each of the first, second and intermediate ring structure being coaxially disposed, concentric with, and independently rotatable with respect to the remaining ring structures; coupling the first shaft of the magnetic gearbox to the first ring structure; coupling the second shaft of the magnetic gearbox to the second ring structure; coupling a rotating machine to the intermediate ring structure, concurrently rotating at least two of the first and second shafts and the rotating machine; and controlling the ratio of power transferred between the first and second ring structures by operating the rotating machine to supply or extract power from the intermediate ring structure.

Many other power coupling techniques deal with arrangements of multiple motor-generators that use generating to convert mechanical power to electrical power, which electrical power is then applied to a motor that converts the electrical power back into mechanical power on another shaft. Such systems rely heavily on electrical power wiring, power connectors, and auxiliary control systems to accomplish the power conversion, with increased cost and unreliability.

An advantage of the present invention is that no mechanical linkage or contact is required between the engine spools, reducing vibration transfer.

Another advantage of the present invention is that it may be internal or external to the engine.

Yet another advantage of the present invention is that it may be applied on other types of mechanical device that require variable torque transmission (e.g., hybrid automotive transmissions, etc.)

Still another advantage of the present invention is that it permits constant torque variable power coupling of one rotating shaft to another without any mechanical contact. The present invention further permits torque or power coupling without an intermediate conversion to electrical power.

A further advantage of the present invention is that it provides a method for controllably transferring mechanical power between spools of any multi-spool turbine engine which is tolerant to faults caused otherwise when mechanical gearing is used. Since there is no mechanical contact between input and output, there is less chance of catastrophic failure or jamming.

The present invention provides a system for extracting greater amounts of mechanical power from turbine engines in a manner that minimizes impact on engine capability, and can potentially enhance engine operability by variably selecting the source of the power extraction Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
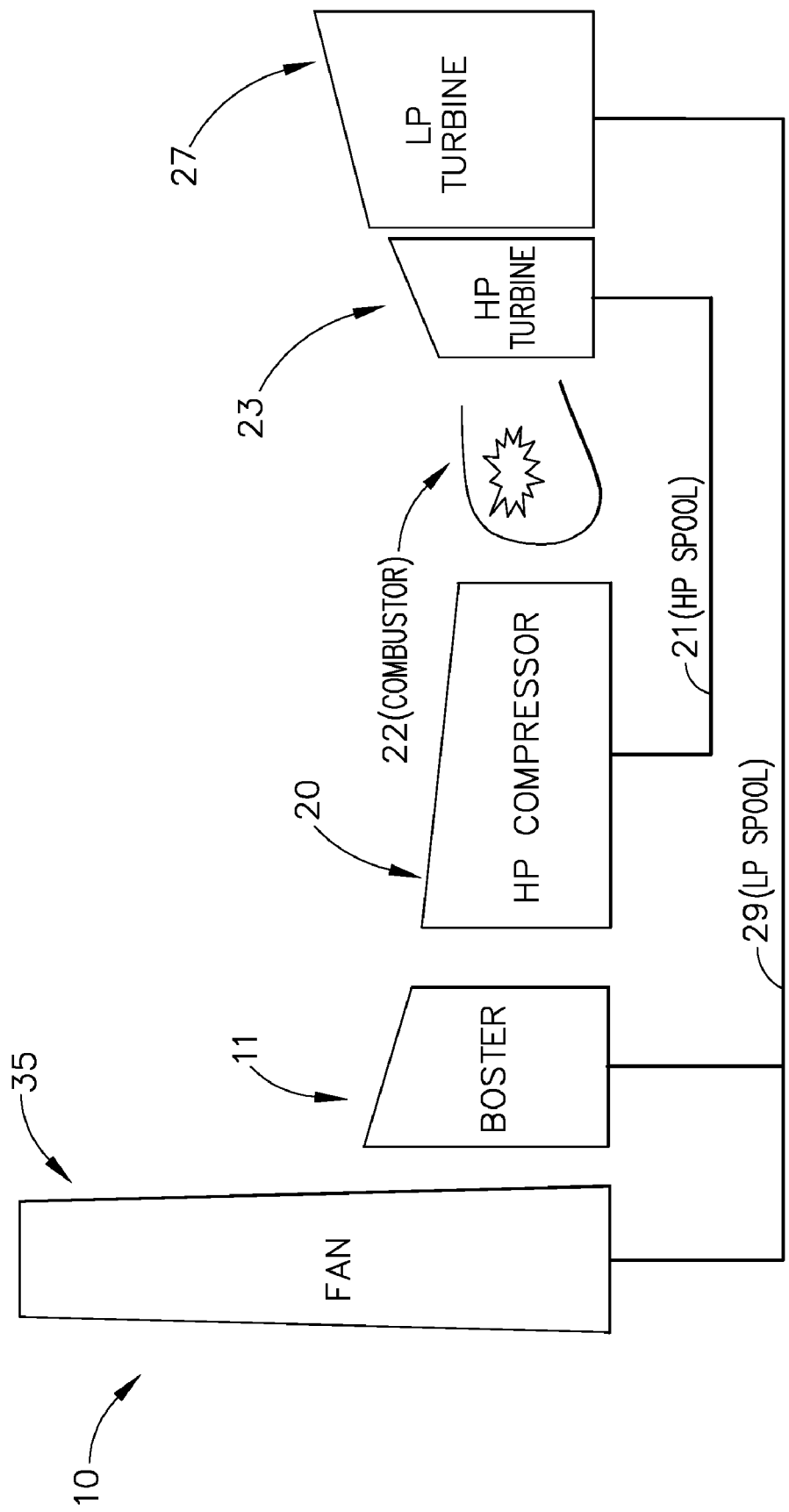
FIG. 1 is a schematic illustration of a generic turbofan engine.

Illustrated in FIG. 1 is an exemplary generic turbofan engine 10 having a fan 35, booster 11, high-pressure compressor 20, a combustor 22, a high-pressure turbine 23 and a how-pressure turbine 27, all arranged in a serial, axial flow relationship. The fan 35, booster 11, and how-pressure turbine are serially connected by the how-pressure spool 29. The high-pressure compressor 20, combustor 22 and high-pressure turbine are serially connected by the high-pressure spool 21.

A combustor 22 in the core engine mixes pressurized air from the high-pressure compressor 20 with fuel and ignites the resulting fuel and air mixture to produce combustion gases. Some work is extracted from these gases by the high-pressure turbine blades (not shown), which drive the high-pressure compressor 20. The combustion gases are discharged from the core engine into a power turbine or low-pressure turbine (not shown) having a row of low-pressure turbine blades.

Figure 2:
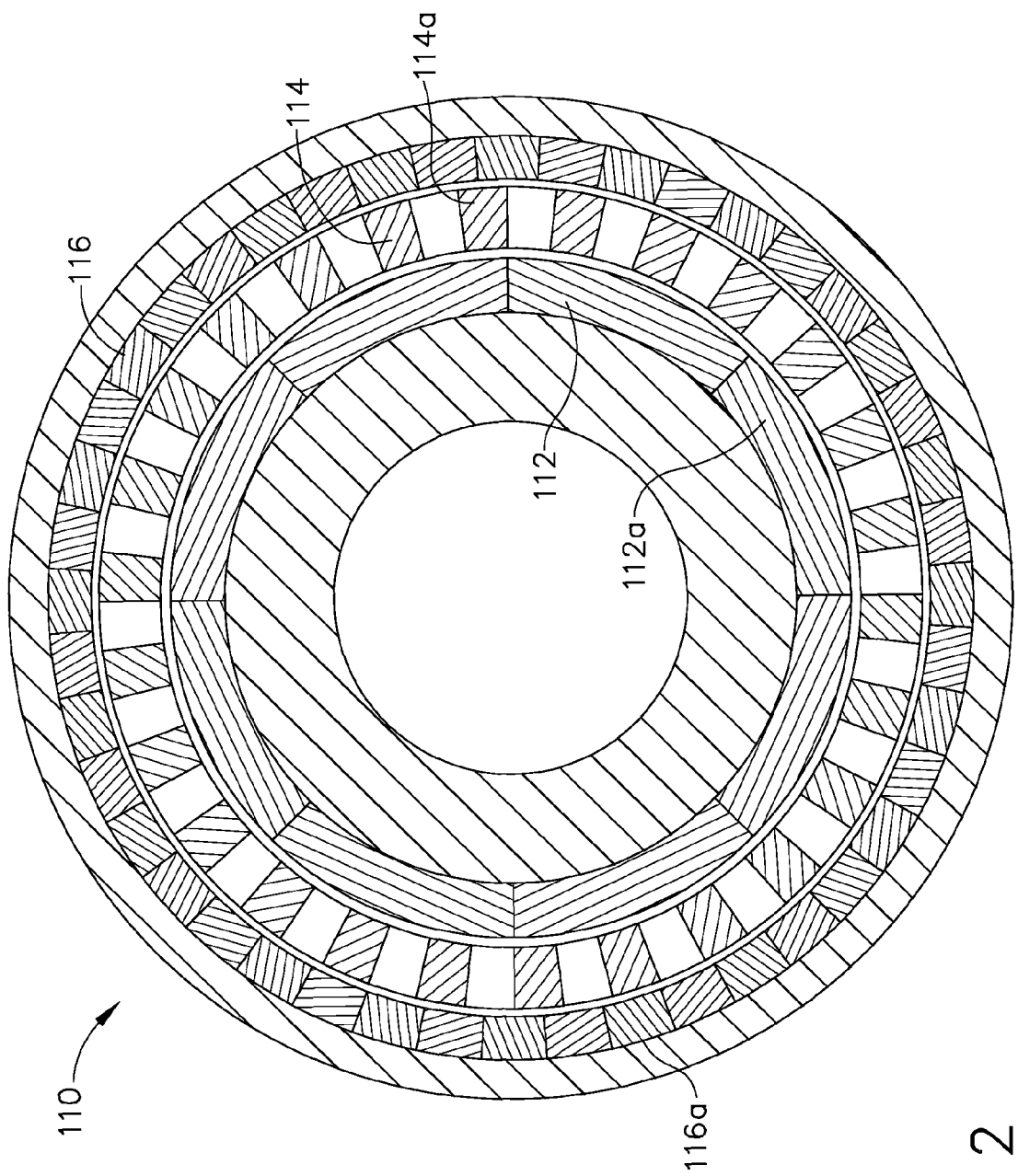
FIG. 2 is a schematic illustration of a magnetic epicyclic gear arrangement.

Referring next to FIG. 2, a magnetic epicyclic gear arrangement or gearbox 110 includes an inner magnet ring 112, a middle or intermediate ring 114 and an outer magnet ring 116. Each ring (inner 112, middle 114 and outer 116) is constructed of a predetermined number of magnetic pole pieces 112a, 114a and 116a embedded at intervals along the ring structures 112, 114 and 116. The pole pieces 112a and 116a are composed of permanent magnets, and pole pieces 114a are composed of magnetically permeable material, the pole pieces 114a separated by magnetically non-permeable sectors 114b. The inner and outer ring structures 112, 116 are composed of magnetically permeable material. The magnetic gear box 110 has a fixed torque ratio defined by the number of poles in each of the rings 112, 114 and 116. The magnetic gear box 110 couples the HP and LP spools 21, 29 of a turbofan engine 10. Note that the fixed torque ratio applies but only in the situation where the rotational velocities of the rings 112, 114 and 116, satisfy Equation 1, which is set forth below. Since the forces in the engine are such that the speeds of the rotors are independent of one another, the ideal torque split is realized only when the intermediate ring is free to rotate with low enough load to preclude slip. The fixed torque ratio is an ideal property that describes where the magnetic gear box 110 tends to operate. Placing a load on the magnetic gear box 110 causes the magnetic gear box 110 to deviate from the ideal relationship, but the resultant forces for small speed variations [from Equation 1 below] are in a direction to restore the ideal torque ratio and bring the speeds into agreement [with Equation 1].

Figure 3:
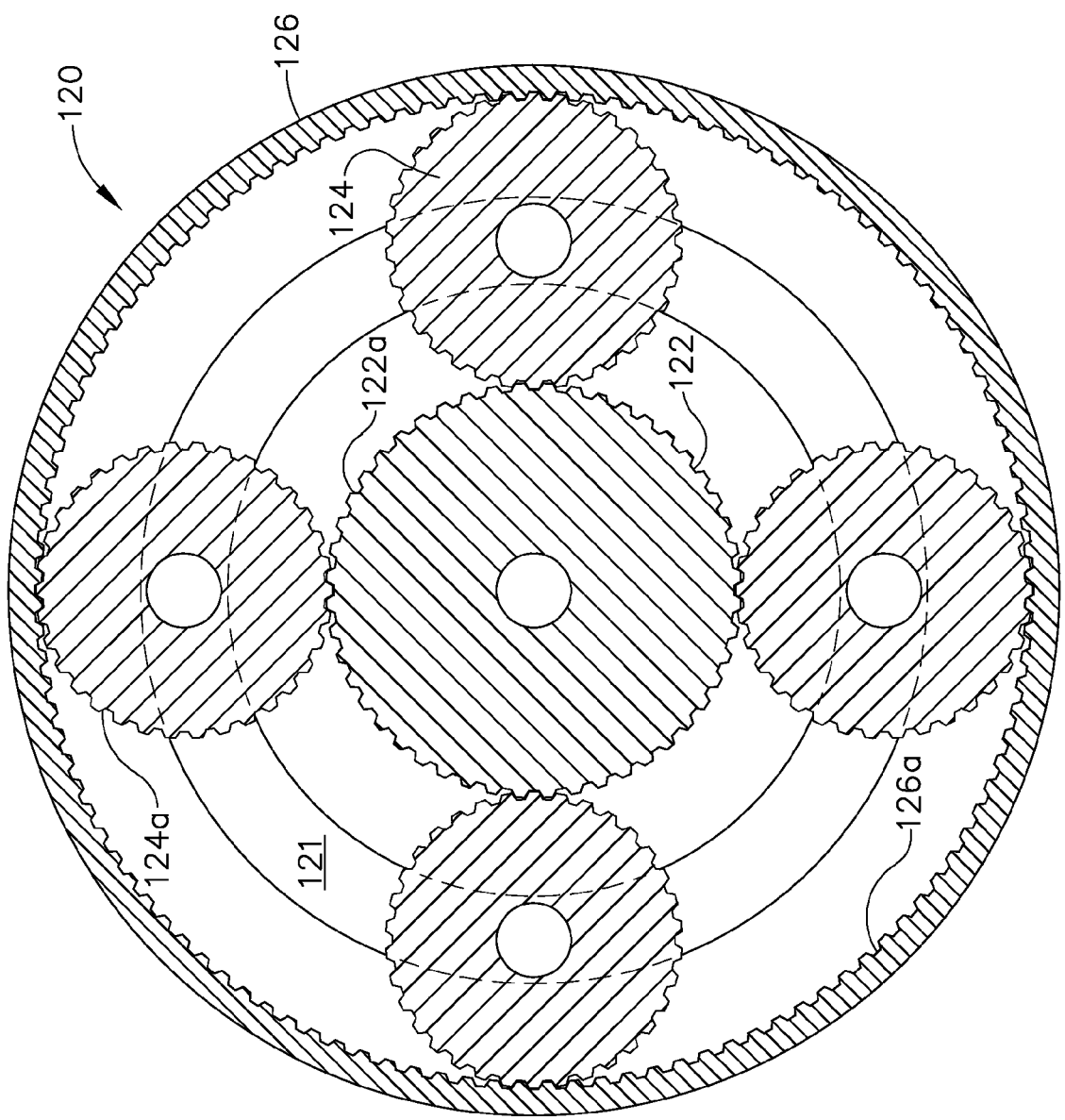
FIG. 3 is a schematic illustration of a mechanical epicyclic planetary gearbox.

The magnetic gear box 110 provides a fully passive magnetic equivalent of a mechanical epicyclic planetary gearbox 120, shown in FIG. 3. A high degree of magnetic coupling is achieved in the magnetic gear arrangement 110, which enables torque densities comparable to the mechanical epicyclic planetary gearbox 120. The magnetic gear box 110, however, operates without mechanical contact between the rings 112, 114 and 116, thus reducing mechanical vibration. The pullout torque allows the magnetic gear box 110 to slip, which permits a factor of safety compared with mechanical gear arrangements that jam and break when subjected to excessive torques. The magnetic gear box 110 presents additional advantage over a mechanical epicyclic gearbox since the gear ratio of the magnetic gearbox can be less than 1 (i.e., $i_0<1.0$, whereas the gear ratio of a mechanical epicyclic gearbox (see, e.g., Equation 2 below) is limited to $i_0>1.0$ ($i_0=1.0$ for a differential gearbox).

Referring again to FIG. 3, the magnetic gear box 110, as described above, has an inner ring 112, an intermediate ring 114 and an outer ring 116, which are analogous with the three main components of the mechanical epicyclic gearbox 120, i.e., the innermost "sun" gear 122, the middle "planet" carriers 124, and the outermost ring gear 126 correspond to the inner ring 112, an intermediate ring 114 and an outer ring 116, respectively. Each of the gears 122, 124 and 126 has teeth indicated as 122a, 124a and 126a, respectively. A planet carrier 121 is used to maintain uniform positions of the middle "planet" carriers 124 around the "sun" gear 122.

Figure 4:
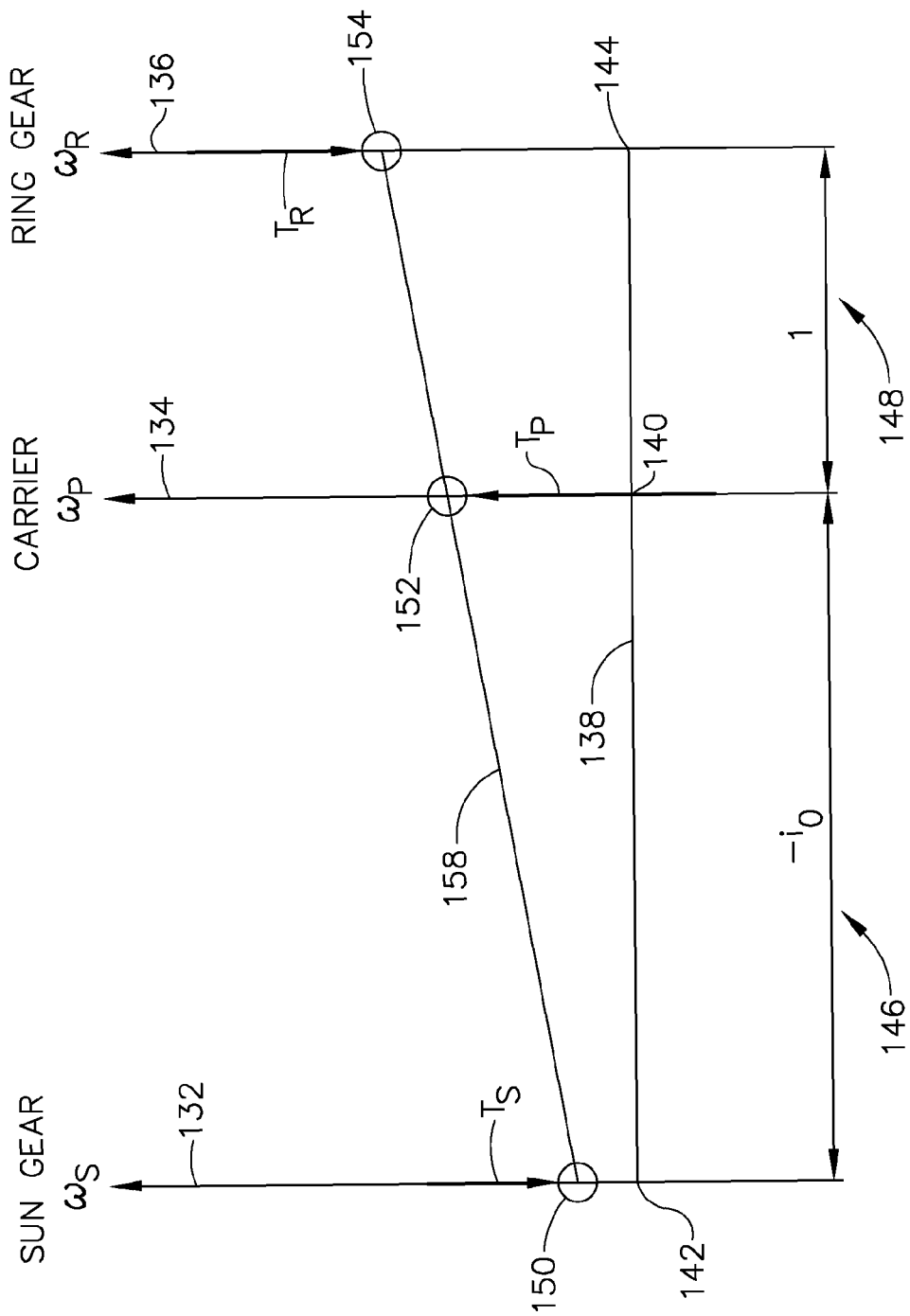
FIG. 4 is a nomograph illustrating the vector mathematical relationship for the epicyclic gearbox of FIG. 3.

Referring to FIG. 4, the angular velocity of the sun gear 122 (designated by $\omega_s$), the planetary gear 124 (designated by $\omega_p$) and the ring gear 126 (designated by $\omega_r$) are illustrated by the nomograph shown in FIG. 4. Each gear angular velocity $\omega_s$, $\omega_p$ and $\omega_r$ is represented by a vertical axis 132, 134 and 136, respectively. The angular velocities $\omega_s$, $\omega_p$ and $\omega_r$ are determined by equation 1 as follows:

$$\omega_c(1-i_0)=\omega_s-(i_0)(\omega_r) \quad \text{Equation 1}$$

where the ratio of the planetary gear set is $i_0$, $$i_0=-z_r/z_s \quad \text{Equation 2}$$

$z_r$=number of teeth of the ring gear and
$z_s$=number of teeth of the sun gear.

The ordinate 140 of the carrier velocity $\omega_c$ is disposed along the horizontal axis 138 between the ordinates 142, 144 of the sun gear velocity $\omega_s$, and the ring gear velocity $\omega_r$. The carrier ordinate 140 divides the distance between the two outer ordinates 142, 144, in the ratio of 1 to $-i_0$, as indicated by arrows 146, 148 beneath the horizontal axis 138. The intersection points 152, 154 and 156 of line 158 with vertical axes 132, 134 and 136, respectively, define values of the angular velocities $\omega_s$, $\omega_c$ and $\omega_r$. By varying the velocity of the epicyclic gearing the sloping line 158 is rotated. The torques $T_s$, $T_c$ and $T_r$ act on shafts of the sun gear 122, the carriers 124 and the ring gear 126 according to equation 3:

$$T_s\omega_s+T_c\omega_c+T_r\omega_r=0 \quad \text{Equation 3}$$

Figure 5:
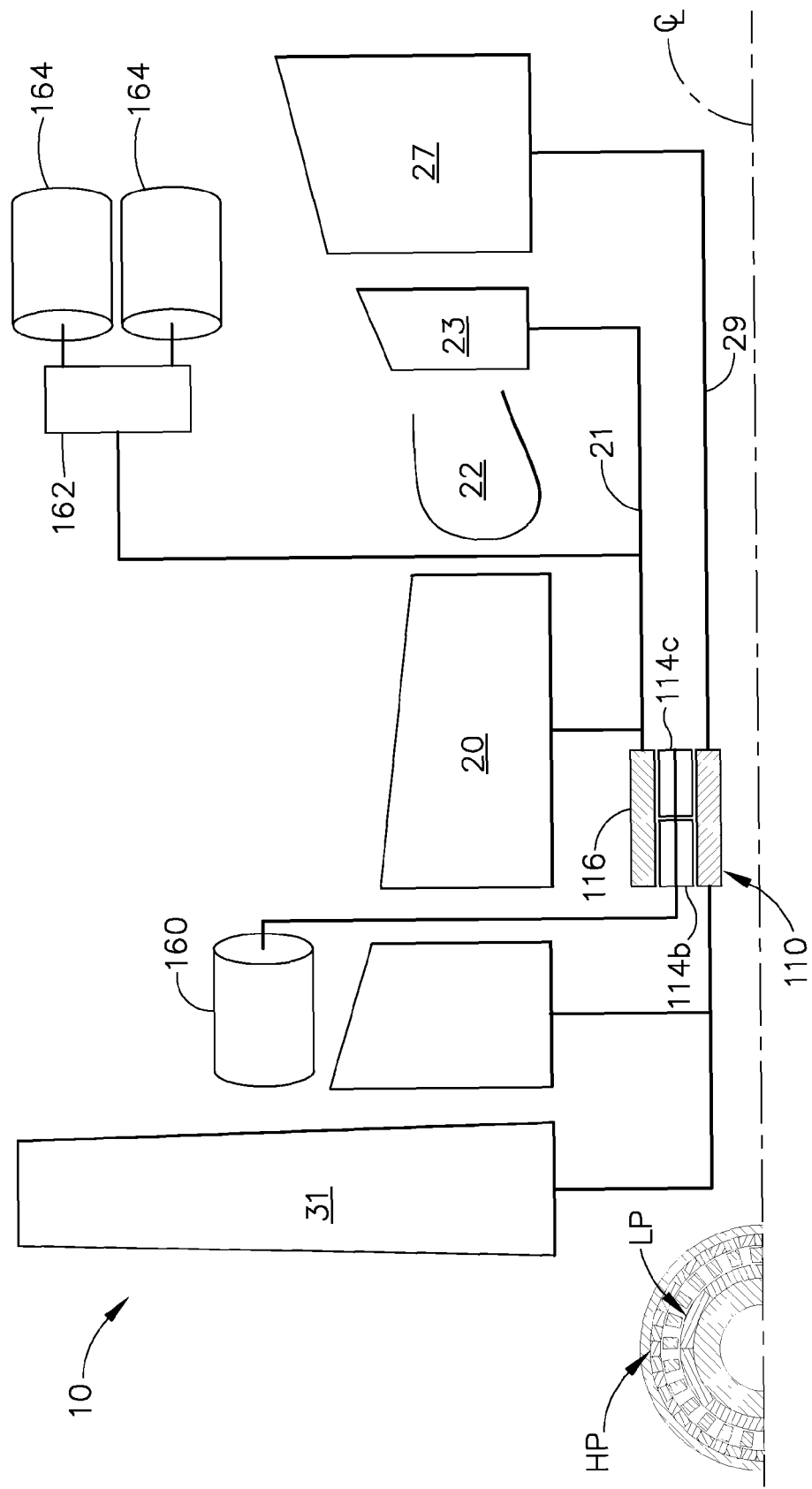
FIG. 5 is a schematic illustration of a turbofan engine 10 having a variable magnetic gearbox.

Referring next to FIG. 5, there is a schematically illustrated turbofan engine 10 having a variable magnetic gearbox 110 disposed between the HP spool 21 and the LP spool 29. The outer ring 116 of the magnetic gear box 110 is coupled to the HP spool 21, the inner ring 112 is coupled to the LP spool 29, and the third ring 114 is coupled to a motor/generator (M/G) 160. The engine 10 also includes a conventional gearbox 162 coupled with HP spool 21 for driving starter/generators 164, 166, which provide the primary source of electrical power for the aircraft systems. It should be understood that the present invention could be applied to engines having more than two spools, in order to connect a higher speed and a lower speed spool of the engine. The intermediate ring 114 is coupled to the M/G 160. The intermediate ring 114 may be split into two effective rings 114b and 114c, which may be controllably adjusted to advance or retard the phasing of the magnetic fields, for cancellation so that the intermediate ring 114 is allowed to free-wheel such that no coupling is provided between the engine spools 21, 29 by the magnetic gear box 110, or for adjusting the degree or percentage of coupling between the inner ring 112 and the outer ring 116. This may be accomplished by mounting two individual rings 114b, 114c, on a common, keyed shaft, and providing a control means (not shown) for phase adjustment of the respective magnetic fields. An alternate method is to provide a single, integrated ring 114 having interleaved poles 114b, 114c with an external phase control (not shown) for the respective magnetic fields. The ability to control the magnetic coupling between the shafts connected to the magnetic gear box 110, particularly by allowing the intermediate ring to free-wheel such that no coupling is provided between the shafts 21, 29 by the magnetic gear box 110, provides a safety feature when it is necessary to separate the two shafts, such as the HP spool 21 and the LP spool 29. It should be noted that the arrangement of the HP spool 21, LP spool 29 and the M/G may be selectively modified as discussed in further detail below, such that the inner ring 112, intermediate ring 114 and outer ring 116 are coupled with any of the HP spool 21, LP spool 29 and the M/G, to achieve alternate torque transfer characteristics.

Figure 6:
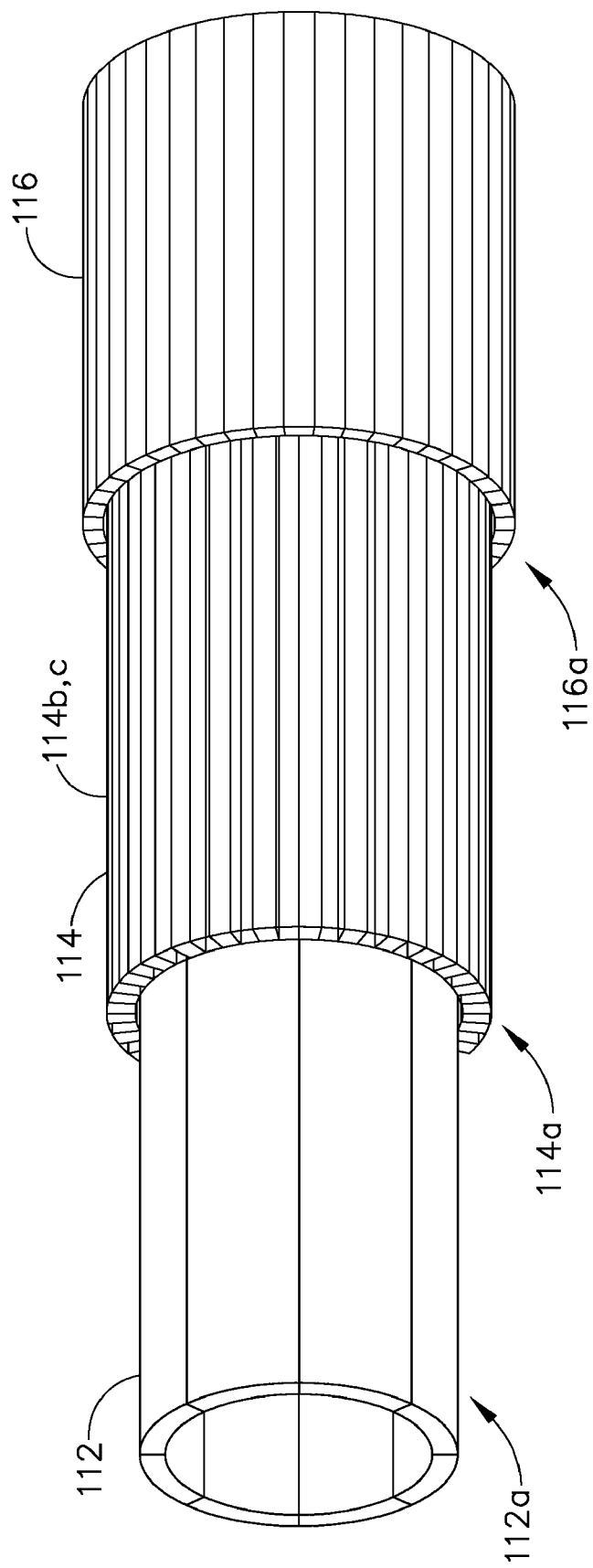
FIG. 6 is an exploded view showing the three-ring arrangement of the variable magnetic gearbox.

Referring to FIG. 6, an exploded view shows the three-ring arrangement of the magnetic gear box 110. Inner ring 112 contains the LP spool magnets 112a. In this embodiment the poles 114b, 114c of the intermediate ring 114 are interleaved, as indicated by the coaxial striations 114b, 144c. The intermediate ring 114 is coupled to the M/G 160 and is used to control the relative distribution of torque between the HP spool 21 and the LP spool 29. The outer magnet ring 116 is coupled to the HP spool 21, and the inner magnet ring 112 is coupled to the LP spool 29. Each of the rings 112, 114 and 116 is coaxial and concentric, and is independently rotatable with respect to the others.

Figure 7:
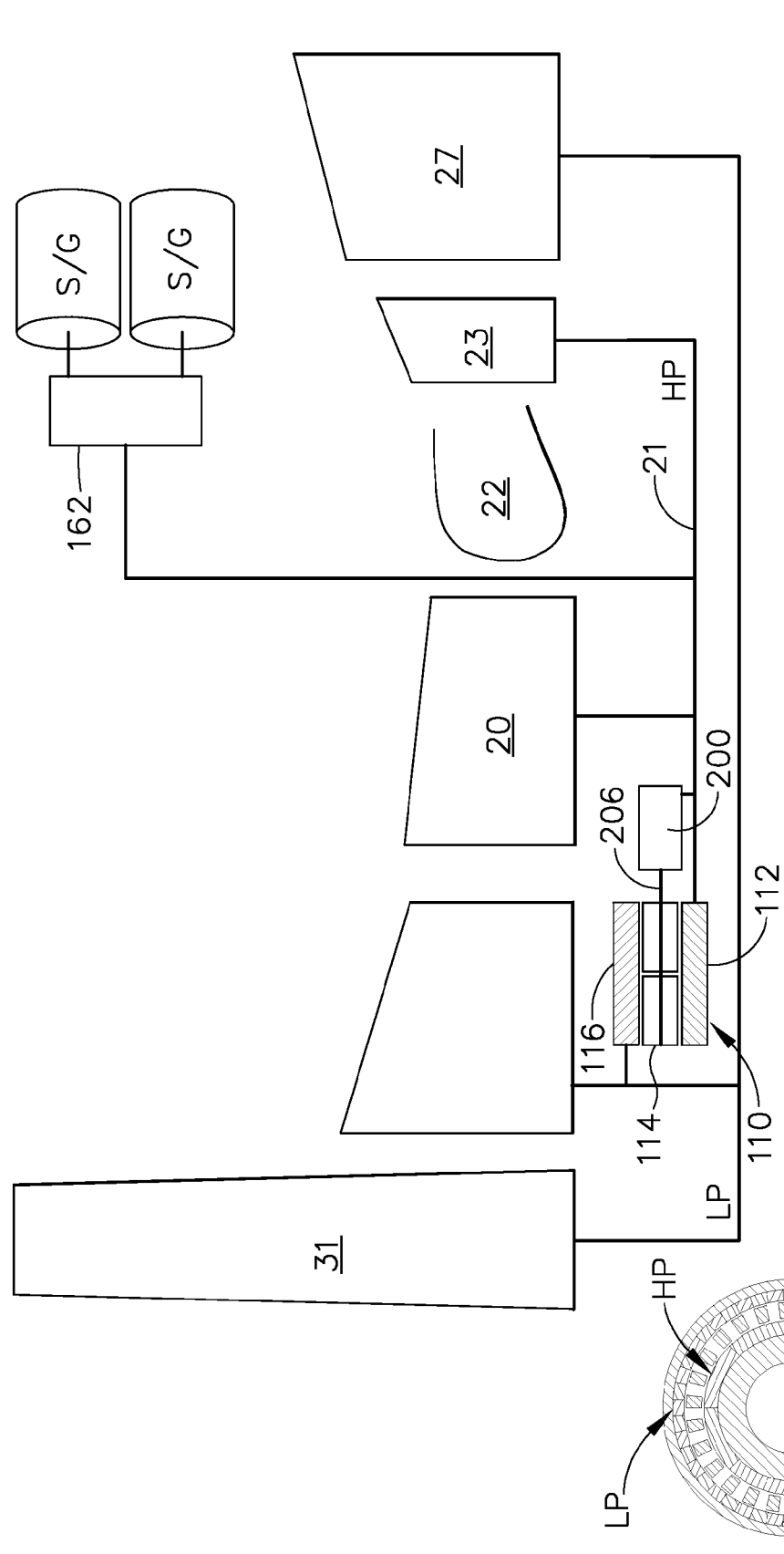
FIG. 7 is a schematic illustration of a preferred embodiment showing a turbofan engine having a variable magnetic gearbox with a variable torque controller.
Figure 8:
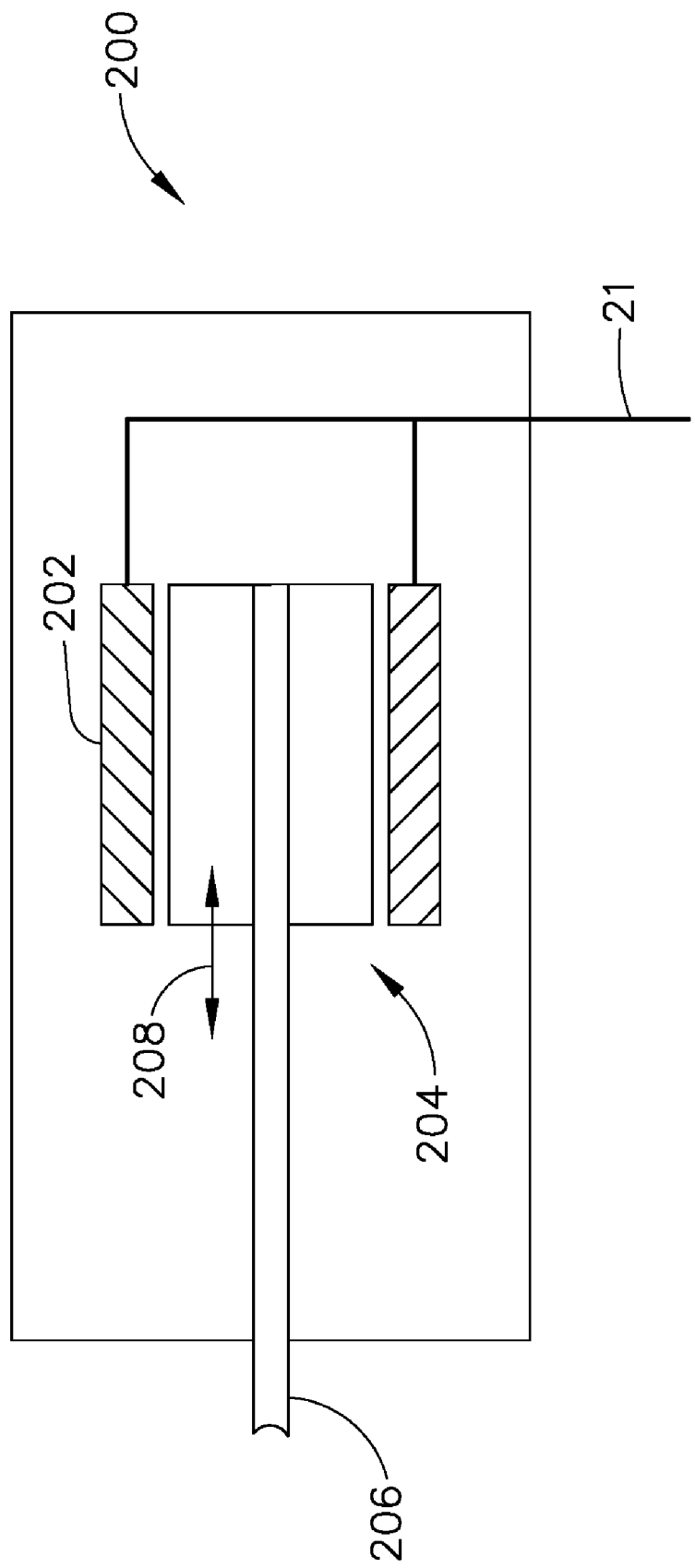
FIG. 8 is a schematic diagram of the variable torque controller shown in FIG. 7.

Referring next to FIGS. 7 and 8, the preferred embodiment of the invention is shown. The magnetic gear box 110 is configure so that the HP spool 21, which normally rotates at a higher speed than the LP spool 29, is coupled to the inner ring magnets 112 for driving the inner ring magnets 112 at a higher speed, and the LP spool 29 is coupled to the outer magnet ring 116 operating at lower speed than the HP spool 21. This relationship follows the natural gearing ratio of the magnetic gear box 10, for a fixed set of planetary teeth 122a, for example. However, the HP & LP spools 21, 29 may operate independently of one another, and at varying speeds. Under such circumstances a fixed-ratio coupling is not acceptable, so the intermediate magnet ring 114 is arranged to rotate independently as well. The intermediate magnet ring 114 will rotate at the angular velocity defined by Equations 1 and 2. Line 158 (See FIG. 4) could pass through zero speed at some particular ratio of HP to LP speed. By applying a torque to a movable intermediate ring 114, torque is transferred to the inner ring 112 and outer ring 116 according to the magnetic gear box equations 1 & 2. The applied torque on the movable intermediate ring 114 can be positive or negative to transfer power in the desired direction. This torque is applied to the spinning intermediate ring 114, and therefore power will flow in either direction at this location. The power source and the load for this transferred power must be supplied variably. For example, a motor-generator 160 could be used to supply or to expend power in the intermediate ring 114, as shown in FIG. 5. However, this electrical power must be obtained from the existing electrical power system. In doing so, circulating power can result, in both mechanical and electrical form. Increases in power system weight and size may result if not carefully taken into account in the design. To minimize undesirable circulating power, a variable torque coupler 200 varies the output torque applied to the intermediate ring 114 or other input to the epicyclic magnetic gear box 110.

As shown in FIG. 8 the variable torque coupler 200 has rotating permanent magnets 202 for inputs, a rotating squirrel-cage-type induction rotor 204 drives an output shaft 206, and a sliding magnetic shield control (not shown). The rotor 204 slides on a keyed output shaft 206 to selectively control the output torque of the variable torque coupler 200. By sliding the variable torque coupler axially with respect to the engine centerline, as indicated by arrow 208, the induced current and torque on the rotor is adjusted. The output of this coupler 200 is applied through shaft 206 to the intermediate ring 114 input of the magnetic gear box 110, which thus controls the flow of power therethrough.

In addition to the variable torque coupler 200, several other configurations may be employed, including continuously- and infinitely-variable mechanical transmissions, hydraulic transmissions, motor-generator combinations, and novel electromechanical arrangements.

The present invention discloses an epicyclic magnetic gear box 110 in combination with a continuously variable method for controlling the flow of power therethrough. The application of this continuous variability may optionally be applied throughout the operating ranges of the HP and LP spools 21, 29, so that, for example, in some operating schemes the intermediate ring 114 may be fully free to rotate without any applied torque. Conversely, in other operating schemes, the intermediate ring 114 may be constrained to rotate in one direction, providing the torque necessary to maintain the speed ratio of the HP spool 21 to the LP spool 29 fixed. The fixed gear ratio of a magnetic gear box is made variable. The magnetic gear box 110 with a variable gear ratio provides the ability to control the transfer of power from a first mechanical rotating shaft to a second mechanical rotating shaft. Optionally, additional gearing stages may be provided to allow optimization of engine spool operating speeds.

Table 1 below sets forth the possible permutations in which the LP spool 29, HP spool 21 and M/G set 160 may be configured for torque-coupling between them.

TABLE 1

| Case | Inner (Sun) Ring Coupled to: | Intermediate (Planetary) Ring Coupled to: | Outer Ring Coupled to: |
| --- | --- | --- | --- |
| 1 | LP | M/G | HP |
| 2 | HP | M/G | LP |
| 3 | LP | HP | M/G |
| 4 | HP | LP | M/G |
| 5 | M/G | HP | LP |
| 6 | M/G | LP | HP |

Figure 9:
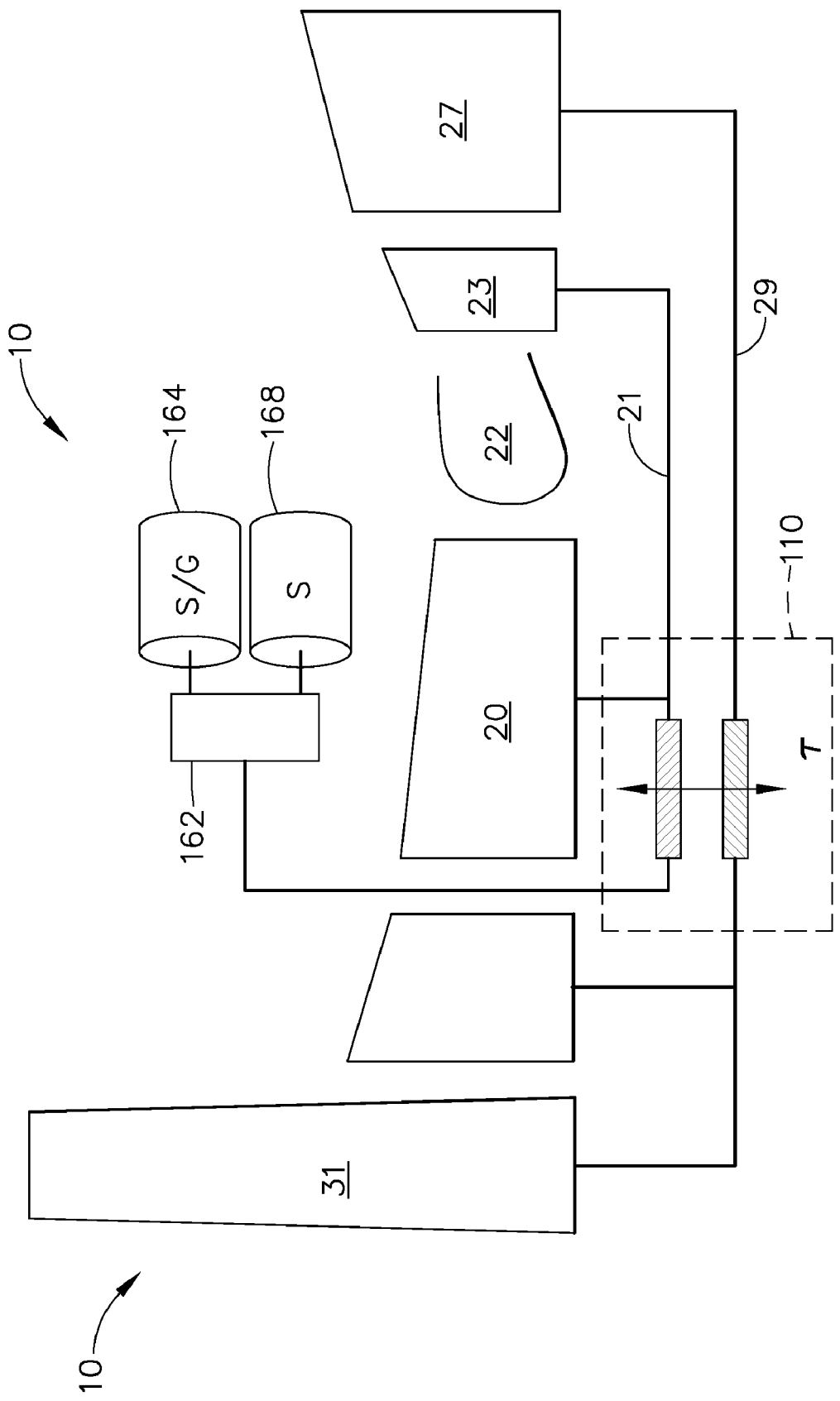
FIG. 9, shows a simplified arrangement wherein the magnetic gearbox is coupled to the HP spool and the LP spool in a fixed ratio arrangement.

In another aspect, the magnetic gear box 110 may provide a fixed ratio of torque transfer between the HP spool 21 and the LP spool 29 of the turbofan engine, wherein the third inputs such as the M/G 160 or the variable torque coupler 200 are not connected to the intermediate magnetic ring 114. E.g., in FIG. 9, there is a simplified arrangement wherein the magnetic gear box 110 is coupled to the HP spool 21 and the LP spool 29. This arrangement extracts power from the HP spool 21 through the standard mechanical gearbox arrangement 162, wherein the gearbox 162 is coupled to one or more starters 168 or starter/generators 164. As power extraction by the starter-generator 164 increases, the LP spool 29 can provide the additional power via magnetic gearbox 110 such that the amount of power provided by the HP spool 21 is approximately constant, allowing the speed of the HP spool 21 to remain constant." This has at least three beneficial effects, namely, (1) low acceleration time for increasing emergency thrust, (2) a high stability margin of the HP spool, and (3) reduced idle thrust due to decreasing LP spool speed. The torque coupling magnetic gear box 110 can be used internally to enhance performance and operability in other ways, e.g., transferring torque to optimize the power split between the HP turbine 23 and the LP turbine 27, or to utilize LP spool 21 as a power source/sink to aid in acceleration or deceleration of the core engine 18. Note that this configuration would not be used as a thrust control device for steady-state airspeed stability, as moving power to the fan while under fan speed control would rebalance the cycle. This could change the fuel flow, but it would not create more thrust.

Various turbofan arrangements may employ the magnetic gearbox 110, other than those examples shown in the figures. As an example, a three-spool turbofan (e.g., HP, LP and auxiliary) may be configured with the magnetic gearbox 110, such that any two spools of the three spools can be connected. Alternately, in a turbofan having three spools, two magnetic gearboxes 110 may be configured to connect any spool to the remaining two spools. In yet another arrangement, a three spool turbofan may be configured such that one magnetic gearbox 110 can be connected to all three spools, with one ring 112, 114 and 116, connected to each spool. The input power to the magnetic gearbox 110 may be sourced from the third spool of a turbofan. Or in a two spool turbofan, a third, dependent spool that is formed by use of a gearbox may be employed to separate parts of the HP spool, such as with a geared fan or a geared booster.

The invention is may also be applied to rotating machines other than turbofan engines. For example, an automotive-style differential drive system may employ a magnetic gearbox 110 wherein the left axle is connected to one ring structure, the right axle is connected to the other of ring structures, and the intermediate ring is fixed [i.e., $i_0$=1]. In straight-line driving with good traction, both rings rotate at the same speed in opposite directions. On curves, the ring speeds deviate slightly, one faster and one slower, and small restoring torques will tend to slow the fast axle and accelerate the slow axle. If one wheel breaks away, there will be some slip speed at which substantial torques act to transfer power from the slipping wheel to the wheel with traction generated to return the wheels to the same rotational speed.

In another application of the invention, a multi-generator power system may be driven from one prime mover, wherein there is one master generator and the rest of the generators are slave generators. The coupling from the prime mover to the master generator is rigid and it is connected to a first ring of multiple magnetic gearboxes 110. The coupling or couplings between the prime mover and the slave generators will be torsionally flexible with limited range of tangential displacement from nominal. The slave generators are connected to one or more secondary rings of a similar number of magnetic gearboxes 110. The intermediate rings 114 are controlled to retard or advance the slave generators within said limited range of tangential displacement such that all slave generators are operating at identical phase angles to the master generator. This arrangement eliminates the problems of gearbox misalignment and wear, rotor and stator manufacturing tolerances, etc., which can cause considerable losses in the power system, and distributes the electrical load more evenly across the generators.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements with insubstantial differences from the literal languages of the claims.

The invention claimed is:

1. A system for transferring torque between a pair of independently, concurrently rotating shafts of an engine, the system comprising:
   a magnetic gearbox, the magnetic gearbox including a first ring structure, a second ring structure and an intermediate ring structure, each of the first, second and intermediate ring structure having an annular aperture therethrough and a plurality of magnetic pole pieces embedded therein, the intermediate ring structure disposed between the first ring structure and the second ring structure, each of the first, second and intermediate ring structure being coaxially disposed, concentric with, and independently rotatable with respect to the remaining ring structures;
   the first and second ring structures each being coupled to separate ones of the rotating engine shafts, and the intermediate ring structure cooperates with the first ring structure and second ring structure and determines the level of torque transferred between the pair of shafts.

2. The system as set forth in claim 1, wherein the intermediate ring structure being coupled to a rotating machine, and the rotating machine having a controller, the rotating machine operable for adjusting a level of torque transferred between the pair of shafts.

3. The system set forth in claim 2, wherein the rotating machine is a motor/generator configured to receive power from and to supply power to the intermediate ring structure in response to a signal generated by the controller, such that the torque is transferred variably between the pair of rotating shafts.

4. The system set forth in claim 2, wherein the rotating machine includes a rotor portion and a third annular ring structure having a plurality of permanent magnets embedded therein, the rotor portion including an output shaft and configured to move bi-directionally along an axis of the rotating machine to magnetically couple the rotor within the third ring, the third annular ring being drivingly coupled to one of the independently rotating engine shafts to induce an electromagnetic field in the rotor portion to selectively control an output torque of an output shaft, and the output shaft of the rotor being coupled to one of the first, intermediate or second ring structure.

5. The system set forth in claim 4, wherein the rotor portion is a squirrel-cage-type induction rotor.

6. The system of claim 2, wherein the first, second and intermediate ring structures having angular velocities $\omega p$, $\omega s$ and $\omega r$, related by the equation:

$$\omega_c(1-i_0)=\omega_s-(i_0)(\omega_r)$$

where the ratio $i_0=z_r/z_s$, and $z_r/z_s$ is a ratio defined by the number of permanent magnets in the first ring structure on an outer planetary ring of the magnetic gearbox, relative to the number of permanent magnets in the second ring structure.

7. The system of claim 6, wherein torques Ts, Tc and Tr correspond to the first ring structure, the second ring structure, and the intermediate ring structure, and apply torque to the first, second and intermediate ring structures according to the equation:

$$T_s\omega_s+T_c\omega_c+T_r\omega_r=0.$$

8. The system set forth in claim 1, wherein the magnetic gearbox comprise a fully passive magnetic equivalent of a mechanical epicyclic planetary gearbox.

9. The system set forth in claim 1, wherein the magnetic gear box pullout torque allows the first and second and intermediate ring structures to slip in response to an excessive applied torque, to prevent mechanical damage to the magnetic gear box.

10. The system of claim 1, wherein the engine is a turbofan aircraft engine having a high pressure turbine coupled to the first shaft, and a low pressure turbine coupled to the second shaft.

11. The system of claim 1, wherein the intermediate ring structure is split into first and second magnetic ring portions, the first and second magnetic ring portions being controllable to advance and retard a phasing of magnetic fields induced in the respective first and second magnetic ring portions for selectively coupling and decoupling the intermediate ring, and adjusting the degree of magnetic coupling between the inner ring structure and the outer ring structure.

12. The system of claim 11, wherein the first and second magnetic ring portions are mounted on a common keyed shaft, and a control means is configured to adjust the relative phase between respective magnetic fields generated by the first and second ring portions.

13. The system of claim 11, wherein the first and second magnetic ring portions are formed in an integrated magnet ring portion having interleaved magnet portions and an external phase control for the respective first and second ring portion magnetic fields.

14. The system of claim 1, wherein the intermediate ring structure is configured to free-wheel such that no coupling is provided between the two shafts.

15. The system of claim 1, wherein the rotating machine is selected from the group consisting of: continuously-variable mechanical transmissions, infinitely-variable mechanical transmissions, hydraulic transmissions, motor-generator combinations, and combinations thereof.

16. A gas turbine engine comprising:
a low pressure turbine spool and a high pressure turbine spool, at least one compression stage, a combustion chamber, an exhaust system and a rotary fan blade arrangement, the low pressure turbine spool and the high pressure turbine spool being magnetically coupled through a magnetic gearbox;
the magnetic gearbox including:
a first ring structure, a second ring structure and an intermediate ring structure, each of the first, second and intermediate ring structure having an annular aperture therethrough and a plurality of magnetic pole pieces embedded therein, the intermediate ring structure disposed between the first ring structure and the second ring structure, each of the first, second and intermediate ring structure being coaxially disposed, concentric with, and independently rotatable with respect to the remaining ring structures;
the first and second ring structures each being coupled to one of the HP turbine spool and the LP turbine spool, and the intermediate ring co-operable to transfer torque between the HP turbine spool and the LP turbine spool.

17. The gas turbine engine of claim 16, wherein the intermediate ring structure being coupled to a rotating machine, and the rotating machine having a controller, the rotating machine operable for adjusting a ratio of power transferred between the HP turbine spool and the LP turbine spool.

18. The gas turbine engine of claim 17, wherein the rotating machine is a motor/generator configured to receive power from and to supply power to the intermediate ring structure in response to a signal generated by the controller, such that the torque is distributed variably between the pair of rotating shafts.

19. The gas turbine engine of claim 17, wherein the rotating machine includes a rotor portion and a third annular ring structure having a plurality of permanent magnets embedded therein, the rotor portion including an output shaft and configured to move bi-directionally along an axis of the rotating machine to magnetically couple the rotor within the third ring, the third annular ring being drivingly coupled to one of the independently rotating engine shafts to induce an electromagnetic field in the rotor portion to selectively control an output torque of an output shaft, and the output shaft of the rotor being coupled to one of the first, intermediate or second ring structure.

20. A method of transferring torque between first and second independently rotating shafts of a gas turbine engine, the method comprising the steps of:
providing an adjustable magnetic gearbox having a first ring structure, a second ring structure and an intermediate ring structure, each of the first, second and intermediate ring structure having an annular aperture therethrough and a plurality of magnetic pole pieces embedded therein, the intermediate ring structure disposed between the first ring structure and the second ring structure, each of the first, second and intermediate ring structure being coaxially disposed, concentric with, and independently rotatable with respect to the remaining ring structures;
coupling the first shaft of the magnetic gearbox to the first ring structure;
coupling the second shaft of the magnetic gearbox to the second ring structure;
coupling a rotating machine to the intermediate ring structure,
concurrently rotating at least two of the first and second shafts and the rotating machine; and
controlling the ratio of torque transferred between the first and second ring structures by operating the rotating machine to supply or extract power from the intermediate ring structure.

21. A system for transferring torque between a plurality of independently, concurrently rotating shafts of an engine, the system comprising:
a magnetic gearbox, the magnetic gearbox including a first ring structure, a second ring structure and an intermediate ring structure, each of the first, second and intermediate ring structure having an annular aperture therethrough and a plurality of magnetic pole pieces embedded therein, the intermediate ring structure disposed between the first ring structure and the second ring structure, each of the first, second and intermediate ring structure being coaxially disposed, concentric with, and independently rotatable with respect to the remaining ring structures;
the first and second ring structures each being coupled to at least one of the plurality of rotating engine shafts, and the intermediate ring operable to transfer torque between the coupled shafts.

22. The system of claim 21, wherein the plurality of rotating shafts includes three shafts, each of the first ring, second ring and intermediate ring being connected to a separate shaft and the magnetic gearbox is operable to transfer torque between all three of the shafts.

23. The system of claim 22, wherein the system includes a pair of magnetic gearboxes configured to connect any one of the shafts to the remaining two shafts.

* * * * *